Oct. 7, 1969  S. WASSERMAN  3,470,572
TOOL FOR APPLYING A PROTECTIVE FOIL TO THE INDIVIDUAL
RODS OF A BARBECUE GRILL
Filed March 14, 1967

INVENTOR.
SEYMOUR WASSERMAN
BY
Leonard H. King
ATTORNEY

United States Patent Office 3,470,572
Patented Oct. 7, 1969

3,470,572
TOOL FOR APPLYING A PROTECTIVE FOIL TO THE INDIVIDUAL RODS OF A BARBECUE GRILL
Seymour Wasserman, North Woodmere, N.Y., assignor to Seymour Wasserman, North Woodmere, and Leonard H. King, Valley Stream, N.Y.
Filed Mar. 14, 1967, Ser. No. 623,083
Int. Cl. B26b 11/00; B21d 33/00, 35/00
U.S. Cl. 7—14.1                              10 Claims

ABSTRACT OF THE DISCLOSURE

A tool is provided for applying an aluminum foil protective cover to the individual bars of a barbecue grill employing a flat sheet of aluminum foil. The tool being defined by a pair of spaced apart, substantially parallel foil shearing members and a pair of forming members positioned above and spaced closer together than the shearing members to cut and bend the foil about each bar.

---

This invention relates generally to accessories for barbecue grills and more particularly to a tool for applying a protective foil to each rod of the grill.

After a barbecue is used for the grilling of meats, the rods are encrusted with dried, fatty material. The grill is unsightly and can be a health hazard if allowed to remain or if the barbecue is reused with the encrusted material still on the rods. Cleaning the rods is a distasteful chore at best. In addition, it is very difficult to clean each rod thoroughly because they are so closely spaced.

Many attempts have been made to apply protective covers to the rods of a barbecue grill or at least make their cleaning a simpler task. Approaches such as the use of removable rods or removable tubular cover members for the rods have been tried. While these expedients are effective, the grill must be specially designed to accept the rods or tubes and to permit their removal. For grills having fixed rods, and this type represents the preponderance of grills in use today, the removable tubular members are not feasible. The most desirable and least costly protection for existing barbecue grills is aluminum foil. However, if a continuous foil sheet is placed flat on top of the rods, the desired charcoal flavor imparted by the glowing charcoal is prevented from reaching the food.

The present invention is a very simple tool that is easily used without the need for practice and skill. It is low in cost to manufacture so that the tool may be readily used as an accessory for existing barbecue grills. Most importantly, the present invention operates on a thin sheet of easily formable low cost commonly available household foil and applies strips of the foil about each rod with a minimum of waste.

The invention may be broadly described as a pair of spaced apart, substantially parallel foil shearing means that straddle each rod. Positioned directly above the shearing means and spaced much closer together than the shearing means are resilient forming means that wrap the several strips of foil about the rods. It should be noted that the space between the shearing means is greater than the diameter or maximum thickness of the rods whereas the space between the parallel forming means is less than the diameter or greatest thickness of the rods. This construction permits the shearing means to cut and bend the foil over the top of each rod and down the sides thereof. The following resilient forming means tucks the downwardly depending areas of each strip of foil underneath the rods.

Accordingly, it is an object of this invention to provide a low cost tool for applying protective foil to the individual rods of a barbecue grill.

It is another object to provide a tool as described above that can in a single operation sever and subsequently deform a thin layer of foil about the individual rods of a barbecue grill.

A further object is to provide a simple, easily used handheld tool that will function in the manner described above on existing barbecue grills.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing like reference characters designate like parts.

Figure 1:
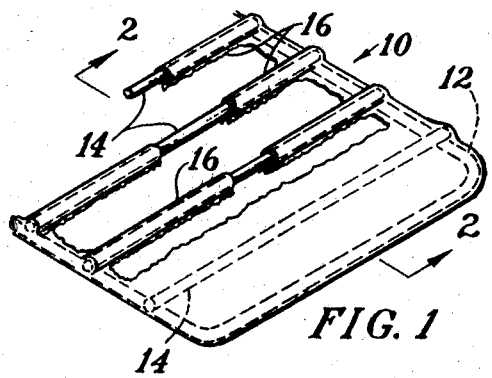
FIG. 1 is a fragmentary, perspective view of the grill portion of a barbecue grill including foil formed about the rods thereof by means of the tool comprising this invention.
Figure 2:
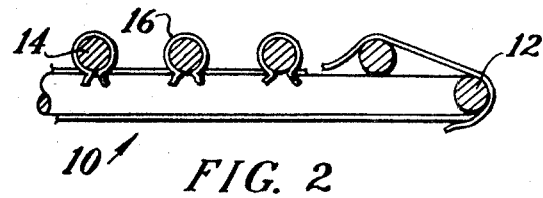
FIG. 2 is a transverse sectional view taken along line 2—2 of FIG. 1.

Referring now to FIG. 1 and FIG. 2, a typical barbecue grill 10 is shown schematically as comprising a frame 12 and a plurality of parallel rods 14 mounted on opposed sides of the frame. Each of the rods has a strip of foil 16 wrapped therearound. By way of example, 0.0005 inch thick aluminum foil, which is presently available in roll form, may be used. The grill has been shown square for purposes of illustration only, it being understood that the present invention will function with any shape grill that utilizes elongated rods to support the articles to be cooked. It should also be understood that the grill will have a concave chamber to support the frame, the chamber being shaped to receive the coals. Since the present invention is not concerned with the remainder of the conventional grill elements such as the chamber or a stand therefor, these elements are not illustrated.

Figure 3:
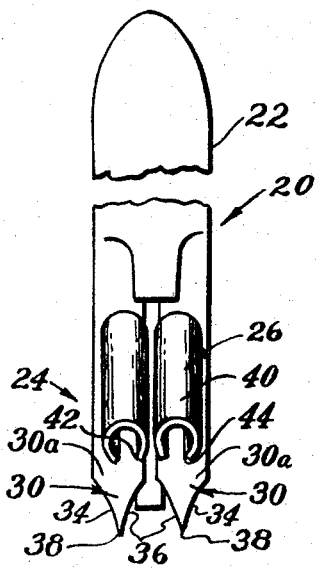
FIG. 3 is a front elevational view of the tool comprising this invention.
Figure 4:
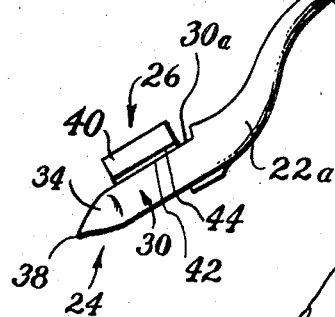
FIG. 4 is a side elevational view of the tool.
Figure 5:
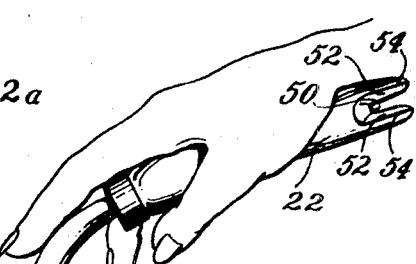
FIG. 5 is a side elevational view of the tool positioned for use.

Tool 20, as shown in FIGS. 3, 4 and 5, is comprised of a handle 22 that has a foil-shearing portion 24 and a foil-forming portion 26 at one end thereof. For the purpose of this description, the handle is shown merely as an elongated generally cylindrical member. However, it may be fabricated, such as by molding of a suitable plastic, to any convenient size and shape.

In the embodiment illustrated, the foil-shearing portion 24 is comprised of two side-by-side, parallel fingers 30, each of which includes a central, elongated edge 32 and outwardly diverging concave sides 34 and 36. The forward end 38 of each shearing finger is somewhat pointed to provide means for initially tearing or piercing the foil. The concave sides of the foil-shearing fingers are contiguous with the pointed forward end for purposes to be described later. Further, the rearward end of each finger is secured to the forward end of the handle by any convenient means. In FIG. 3 and FIG. 4, it will be seen that the inside surface of the foil-shearing finger are spaced apart. The fingers are forked extensions of handle portion 22a.

Referring once again to FIG. 3 and FIG. 4, it will be seen that the foil-forming portion 26 is mounted on the flat top sections 30a of each foil-shearing section. A resilient material such as a resilient foamed polyurethane or rubber may be used for the foil-forming members. Although elongated, deformable tubular members 40 are shown in the drawing, it should be understood that other shapes may be used provided certain functional requirements that will be disclosed later are met. Members 40 are secured to top sections 30a along one edge 42, for example, by glueing, such that the other elongated edge 44 is free. From the point where edge 42 is secured, the outer surface of each member 40 converges towards a theoretical longitudinal center line of the tool and then diverges. In the embodiment illustrated, the members 40 are substantially circular in cross section and almost abut each other along the tool center line. However, other shapes may also be used.

Certain dimensional relationships of the shearing and forming portions should be emphasized. It is important that the transverse spacing between edges 32 be greater than the diameter or greatest thickness of the rod. The spacing between the opposed uppermost edges of concave sides 36 should be approximately the same and only slightly larger than the diameter or greatest thickness of the rods, while the converging resilient sides of the forming members 40 should be as close to each other as possible or at least substantially less than the diameter of the rods.

Figure 6:
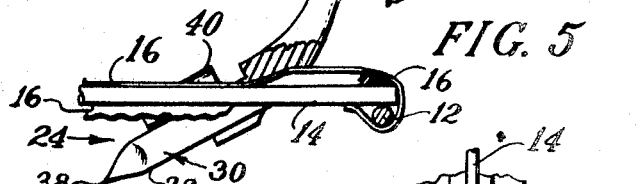
FIG. 6 is a fragmentary front elevational view showing the new tool about to begin the application of foil.
Figure 6:
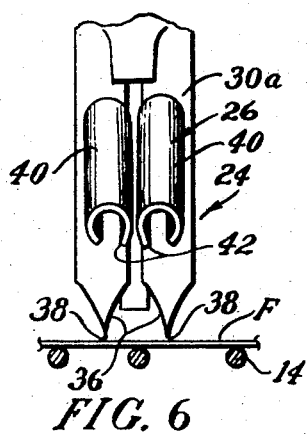
Figure 7:
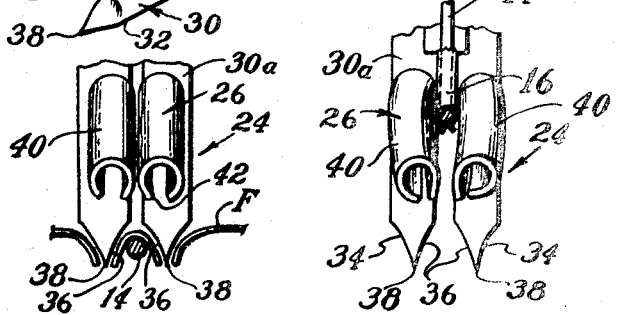
FIG. 7 is a fragmentary plan view illustrating the tool during the shearing of the foil about one of the barbecue grill rods.
Figure 8:
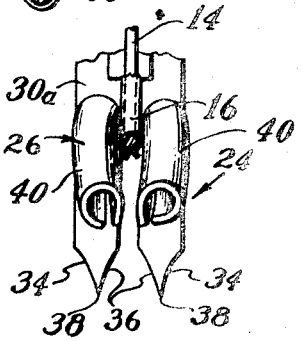
FIG. 8 is a fragmentary front elevational view showing the forming means of the tool performing the last step of applying the foil about a barbecue grill rod.

The operation of the new tool may best be understood by reference to FIGS. 6–8. A sheet of thin foil F is placed over all the rods of the grill and crimped around the outer edge of the grill to temporarily hold the foil in place. Then the tool is positioned, as shown in FIG. 6, such that the shearing fingers straddle one of the rods. A small downward force causes forward pointed ends 38 to pierce the foil. By pulling the tool along a path parallel to the rods and by directing members 30 downwardly as shown in FIG. 7, edges 32 will cut the foil whereupon opposed concave surfaces 36 will direct the severed foil about rods 14. A continued downward motion of the tool coupled with the longitudinal pulling movement will result in the forming members 40 moving below the rods. Because of their resilient nature, the members 40 will separate to pass the rods and then return to an approximation of their original position below the rods. This action is illustrated in FIG. 8 where it is seen that the foil is tucked under the rods.

Still another feature of the tool is shown in FIG. 3 and FIG. 4. A notch 50 is formed in the rearward end of handle 22. The notch is defined by two opposed surfaces 52 that are positioned at an angle with respect to each other to provide two elongated and relatively thin edges 54. After use, the foil is stripped off the grill. In order to remove any remaining bits of the foil wrapped around a rod, the notch is positioned on the foil and rod and then dragged along the rod so that edges 54 scrape the foil off of the rod. Edges 54 need not be sharp enough to cut. The pulling action of the handle will be sufficient to scrape away the easily deformable foil.

From the foregoing, it is apparent that a low cost tool has been provided that can simply, quickly and effectively wrap a length of foil about each rod of a barbecue grill. There is a minimum of waste of the foil and the entire job is completed by repeating the above steps for each rod. The foil is removably locked around each rod and the grill is ready for cooking. After usage, the foil may easily be removed off and discarded and the rods remain clean.

What is claimed is:

1. A tool for applying protective foil to the individual rods of a barbecue grill, said tool comprising:
   (a) a handle;
   (b) foil-slitting means integral with said handle; and
   (c) foil-forming means integral with said handle proximate said foil-slitting means, said forming means being arranged to act on the foil immediately subsequent to the slitting thereof whereby the foil is wrapped about each rod of the barbecue grill.

2. The apparatus in accordance with claim 1 wherein said foil-slitting means comprises a pair of parallel, spaced apart fingers having slitting edges, the space between said fingers being greater than the maximum thickness of the barbecue rods.

3. The apparatus in accordance with claim 1 wherein one end of said foil-slitting means is pointed to define a foil-piercing portion.

4. The apparatus in accordance with claim 2 wherein the inwardly facing opposed portions of said fingers are concave.

5. The apparatus in accordance with claim 1 wherein said forming means are resilient and are comprised of a pair of parallel members having a space therebetween that is less than the thickness of the barbecue rods.

6. The apparatus in accordance with claim 5 wherein said forming members are parallel to and spaced from said slitting means.

7. The apparatus in accordance with claim 5 wherein said forming members are resiliently deformable.

8. The apparatus in accordance with claim 5 wherein said forming members are elongated, curled, resilient sheet members, defined by a first free edge and a second edge rigidly secured to said handle.

9. The apparatus in accordance with claim 1 including foil removal means integral with said handle.

10. The apparatus in accordance with claim 9 wherein said foil removal means comprises a notched portion integral with said handle, said notched portion having two surfaces positioned at an angle with respect to each other to define at least two relatively thin edges positioned at an angle with respect to each other, said edges being spaced from each other by a distance at least a slightly greater than the combined thickness of a barbecue rod and a layer of foil wrapped thereabout.

References Cited
UNITED STATES PATENTS

| | | | |
|---|---|---|---|
| 619,949 | 2/1899 | Flynn | 81—43 |
| 3,316,949 | 5/1967 | Canfield | 145—46 |

ROBERT C. RIORDON, Primary Examiner

R. V. PARKER, Jr., Assistant Examiner

U.S. Cl. X.R.

29—243.57, 059; 72—458, 461